United States Patent [19]
Walker et al.

[11] Patent Number: 5,584,696
[45] Date of Patent: Dec. 17, 1996

[54] HANG GLIDING SIMULATION SYSTEM WITH A STEREOSCOPIC DISPLAY AND METHOD OF SIMULATING HANG GLIDING

[75] Inventors: Joe L. Walker, Salt Lake City; Paul C. Lyon, Sandy; Richard B. Linton; Rulon Nye, both of Salt Lake City; Ralph W. Fisher, Park City; Jeffrey B. Edwards; Clifford N. Cox, both of Salt Lake City, all of Utah

[73] Assignee: Evans & Sutherland Computer Corp., Salt Lake City, Utah

[21] Appl. No.: 282,925

[22] Filed: Jul. 28, 1994

[51] Int. Cl.⁶ .............................. G09B 9/24; G09B 9/34
[52] U.S. Cl. .................... 434/43; 434/69; 434/44
[58] Field of Search ................... 434/29, 30, 38, 434/40, 43, 44, 69; 359/13, 14, 330, 331, 472

[56] References Cited

U.S. PATENT DOCUMENTS

| | | |
|---|---|---|
| 3,659,920 | 5/1972 | McGlasson . |
| 3,709,581 | 1/1973 | McGlasson . |
| 4,028,725 | 6/1977 | Lewis ........................... 358/109 |
| 4,195,911 | 4/1980 | Bougon et al. . |
| 4,345,817 | 8/1982 | Gwynn . |
| 4,623,223 | 11/1986 | Kempf ........................... 350/138 |
| 4,647,966 | 3/1987 | Phillips et al. . |
| 4,952,152 | 8/1990 | Briggs et al. . |
| 5,134,521 | 7/1992 | Lacroix et al. ................ 359/631 |
| 5,243,448 | 9/1993 | Banbury ........................ 359/13 |
| 5,252,068 | 10/1993 | Gryder . |
| 5,320,534 | 6/1994 | Thomas ......................... 434/44 |
| 5,348,477 | 9/1994 | Welch et al. .................. 434/43 |
| 5,396,349 | 3/1995 | Roberts et al. ................ 359/14 |

Primary Examiner—Christopher A. Bennett
Attorney, Agent, or Firm—Darby & Darby P.C.

[57] ABSTRACT

The present invention is directed to a simulation system for simulating virtual reality experiences such as for the sport of hang gliding or the like. The simulation system has a stereoscopic and collimated virtual image display, for providing pupil forming simulated images to a rider at a fixed point of reference relative to the stereoscopic display. In the disclosed embodiment, the simulation system comprises a mechanical support structure for suspending the rider in a harness so as to allow freedom of movement. The rider is suspended to face a visual display over a movable control bar coupled to the mechanical support structure. By maneuvering the control bar, riders may view the results of their actions as by a simulated display. The visual display is coupled to the control bar to receive electrical signals indicative of the movements initiated by the riders as they maneuver through a programmed environment. The visual display provides stereoscopic "pupil forming" images of positional states of the hang glider to the riders at a fixed point of reference relative to the visual display. The fixed point of reference is provided by limiting movement of the rider's head relative to the visual display, as for example with a head rest disposed directly above the viewing area of the visual display.

8 Claims, 3 Drawing Sheets

HANG GLIDING SIMULATION SYSTEM WITH A STEREOSCOPIC DISPLAY AND METHOD OF SIMULATING HANG GLIDING

FIELD OF THE INVENTION

This invention relates generally to a system and method for simulating virtual reality experiences in a suspended environment, such as for simulating the sport of hang gliding or the like. More particularly, this invention relates to a hang gliding simulation system having a stereoscopic, collimated virtual image display for providing pupil forming simulated images to a suspended person, at a fixed point of reference relative to the stereoscopic display.

BACKGROUND AND SUMMARY OF THE INVENTION

Over the years, many systems for simulating virtual reality experiences have been developed to facilitate training, as well as provide entertainment. Simulation systems can be operated by persons desirous of experiencing particular endeavors, by manipulating conventional controls, to be shown the results of their actions as by simulated displays. For example, in training activities, simulators are widely used to provide experience in airplanes, helicopters, ground vehicles and so on. More recently, simulators for entertaining and educating children and adults alike, in sport exercises and the like, have gained tremendous popularity.

To that end, current state of the art technology used in creating simulation systems typically involves a visual display. Thus, as the person operating the simulation system manipulates the controls of the system, he or she is provided with a responsive display showing his or her view, as the simulator simulates movement through a programmed environment. Contemporary simulators utilize advanced computer graphics techniques to provide a dynamic display. An environment is programmed and positional signals are developed to indicate the position and orientation of the simulated vehicle in the environment. Representative simulator data is subsequently supplied to a computer graphics system to attain a dynamic display.

Consider the sport of hang gliding as one example, where persons may desire to experience the thrill of the sport without being exposed to the actual dangers of participating in the sport. Recent methods of flight simulation, relating to light aircrafts including hang gliders, for people in search of the eternal thrill of flying, employ digital microprocessors or computers and accompanying software programming. There are several commercially available flight simulation software packages, which can be run on personal computers. For example, Microsoft's "Flight Simulator®," version 4.0 includes a sailplane simulation. Microsoft's "Aircraft and Scenery Designer," version 1.0 can be used to modify the sailplane flight characteristics so that it accurately simulates hang glider performance.

Different landscapes and environments can be created using the scenery design portion of the software, providing a means for creation of various flying sites and situations. Several computer peripheral devices such as joysticks, yokes, rudder pedals or the like, are typically used to provide input for the computer based simulators.

However, none of these simulation packages provide a real-time virtual reality experience of suspended flight.

Turning now to display systems utilized in current simulation systems, it should be recognized that large screen displays have the capability of operating in real-time at high resolution rates to provide three-dimensional images of video information. Generally, stereoscopic imaging capability enhances displays, by portraying data containing altitude, distance and ocean depth information in conjunction with other inter-related operational parameters.

The stereoscopic imaging process has two fundamental requirements. First, two distinct and different images must be presented to the viewer, each of which presents the scene from the view point of one of the viewer's eyes. Next, the system must be able to assure that each eye sees only the one view intended for it, that is, the images must be separated, one to each eye. Stereoscopic image separation is generally performed by any one four methods: (1) Optical separation (using lenses, prisms, mirrors etc.), (2) Color separation (anaglyphs), (3) Temporal separation (using shutters, etc.) and (4) Polarization separation (using polaroid filters).

Of these, the most amenable to large screen projection systems has traditionally been the polarization technique. However, the polarization technique requires that the two images be projected with orthogonal polarizations, and that the viewer wear a pair of polaroid glasses whose polarization axes are arranged at right angles to one another.

Color separation relies upon encoding the left and right images, such that the left eye and the right eye images are portrayed in colors and such that the viewer sees two different color images. This makes it difficult to portray full color images, produces eye fatigue through color bombardment, which in turn desensitizes the visual system with respect to the colors involved and creates problems for ambient viewing.

Temporal separation requires the viewer to wear eyeglasses attached to the video system with a cord and is often accompanied by high voltages in the eyeglasses.

Optical separation has thus far required bulky, often elaborate optical apparatus between the screen and the observer to separate the images.

Achieving a realistic visual display can be an expensive undertaking, which is not always practical, particularly for entertainment simulators. Thus, a need exists for improved and inexpensive techniques for providing more realistic virtual reality experiences and simulated displays.

The present invention is directed to a simulation system for simulating virtual reality experiences with a stereoscopic and collimated virtual image display, which utilizes a unique and inexpensive optical separation technique for providing "pupil forming" simulated images to a person at a fixed point of reference relative to the stereoscopic and collimated virtual image display. In accordance with the disclosed embodiment, the simulation system of the present invention simulates the sport of hang gliding or the like, largely in an entertainment based system. The simulation system of the present invention may alternatively be used for training purposes as well.

As disclosed, the simulation system comprises a mechanical support structure for suspending a rider in a harness so as to allow freedom of movement. The rider is suspended to face a visual display, over a movable control bar coupled to the mechanical support structure. By maneuvering the control bar, riders may view the results of their actions as by a simulated display. The visual display is coupled to the control bar to receive electrical signals indicative of the movements initiated by the riders as they maneuver through a programmed environment. The visual display, which is a stereoscopic and collimated virtual image display provides "pupil forming" images of positional states of the hang glider to the riders, at a fixed point of reference relative to the visual display. The fixed point of reference is provided by limiting movement of the rider's head relative to the visual display, as for example with a head rest disposed directly above the viewing area of the visual display.

The stereoscopic and collimated virtual image display facilitates a very wide field of view and accommodates the rider's eyes to focus at infinity. Thus, the programmed environment or imagery appears to be in the distance and, not only is the binocular convergence of the rider's eyes parallel, but the focus of the eyes is relaxed as if collimated.

BRIEF DESCRIPTION OF THE DRAWINGS

In the drawings, which constitute a part of the specification and where like reference numerals indicate like parts, exemplary embodiments of the present invention exhibiting various objectives and features thereof are set forth. Specifically.

DETAILED DESCRIPTION OF THE PREFERRED EMBODIMENT

As required, a detailed illustrative embodiment of the present invention is disclosed herein. However, the hang glider simulation system described in connection with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
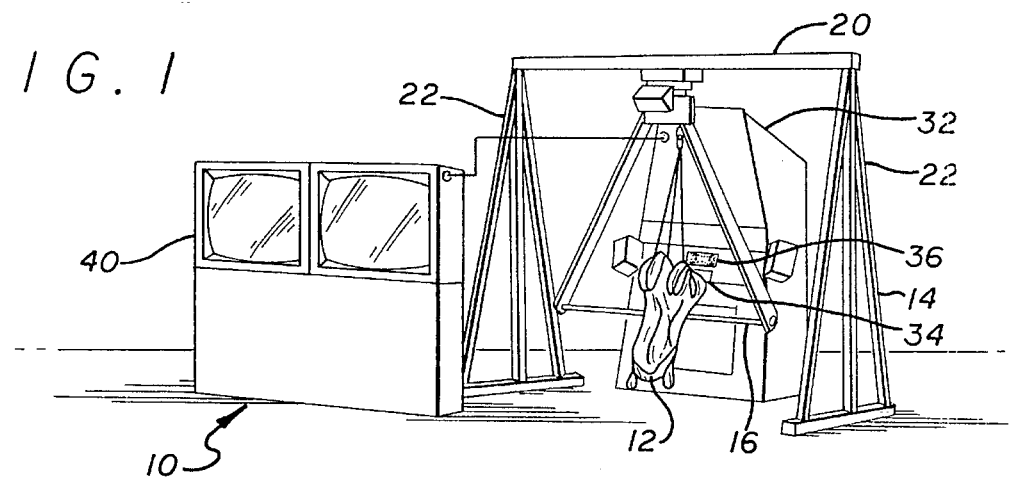
FIG. 1 is a pictorial and block diagram of a hang glider simulation system constructed in accordance with the present invention.
Figure 2:
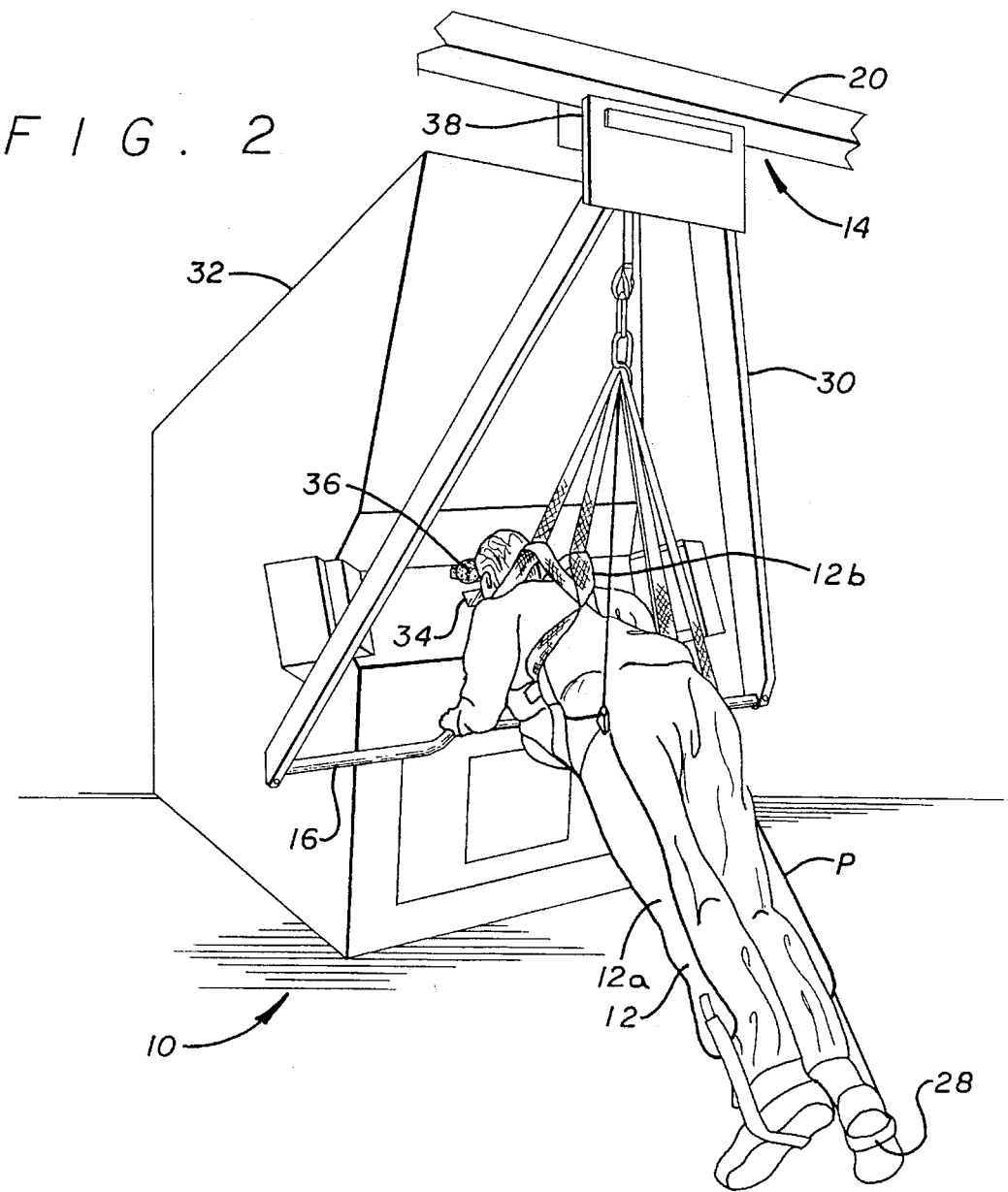
FIG. 2 is a pictorial and block diagram illustrating a rider emulating a pilot suspended from a mechanical support structure to face a visual display for viewing the results of actions initiated by that rider as by a stereoscopic and collimated virtual image display.

Referring initially to FIG. 1, a hang glider simulation system is generally represented at 10 to enable virtual reality experiences that may be achieved by persons for entertainment or training purposes. The present invention provides a simulation system for transforming movements initiated by a suspended rider P emulating a pilot, into signals representative of the movements, which control a simulated dynamic display. In accordance with one embodiment, the rider P is suspended in a harness-like structure 12 (FIGS. 1 and 2) from a mechanical support structure 14. The harness 12 allows the suspended rider P freedom of movement to maneuver a movable control bar 16.

The harness 12 includes a garment portion 12a constructed from a suitable material such as durable plastic or the like, and a strap portion 12b suspended from the mechanical support structure 14 comprising a framework of members arranged to support persons of varying weight. As disclosed, the mechanical support structure 14 comprises a top member 20 disposed between spaced-apart support members 22 extending upward from the floor.

The harness 12 swings freely and the garment portion 12a is configured to substantially conform to the shape of a rider's body. When a rider is suspended in the harness 12, the strap portion 12b (center, FIG. 2) and stirrups 28 (bottom, FIG. 2) hold the rider in a substantially horizontal plane to simulate the configuration for a hang glider, gliding through the air. The strap portions 12b cross over the rider's shoulders and back while the stirrups 28 secure the rider's feet.

Thus, the suspended rider P, may reach and hold onto the control bar 16, which is flexibly disposed below the harness 12. The control bar 16 is movably secured to the top member 20 of the mechanical support structure 14 by triangular frame members 30. By moving the control bar 16 forwards, backwards or sideways, the suspended rider P can simulate at least one of the pitch, roll or yaw movements of a hang glider.

In the disclosed system, the interactive computer video system, indicated generally at 32, includes a viewing aperture 34 (center, FIG. 2) through which the rider P views the simulated-response display in the programmed environment; responsive to control movements of the control bar 16.

A head rest 36 (FIGS. 2 and 3) is disposed directly above the viewing aperture 34 to accommodate the rider's forehead in the interest of providing a fixed point of reference. In other words, the head rest 36 serves to position the rider's head, and limit movement relative to the viewing aperture 34. In addition, contrary to some prior simulation systems, which have typically required persons to wear a helmet or some such contraption, the present invention provides an environment ideal for entertainment purposes since head contact is limited only to the head rest.

Referring once again to FIG. 1, duplicate external displays 40, for example, CRT (cathode ray tube) monitors (left, FIG. 1) may be provided at predetermined locations to allow surrounding viewers (not participating in the simulation exercise) to monitor a particular rider's performance.

The hang glider simulator 10 also includes a control transducer 38, utilizing conventional simulator-graphics technology, associated with the mechanical support structure 14 for transforming the movements initiated by the suspended rider P into signals representative of the movements. The control transducer 36 may be located at any suitable location, such as at the top of the mechanical support structure on the top member 20. For example, the suspended rider may move the control bar 16 forwards, backwards or sideways to simulate at least one of the pitch, roll or yaw movements of a hang glider.

The mechanical support structure 14 and control transducer 36 are linked to, and associated with, a computerized flight simulation system which is disclosed in further detail below and includes a computer, flight simulation software and a video monitor embodied generally in the interactive computer system indicated at 32. The computerized flight simulation system is operable in response to the signals generated by the control transducer 36. It should be recognized that in accordance with the current state of technology, a visual display (display 42, left, FIG. 3) provided by a video monitor 42 is considered a necessary component of a simulator.

Figure 3:
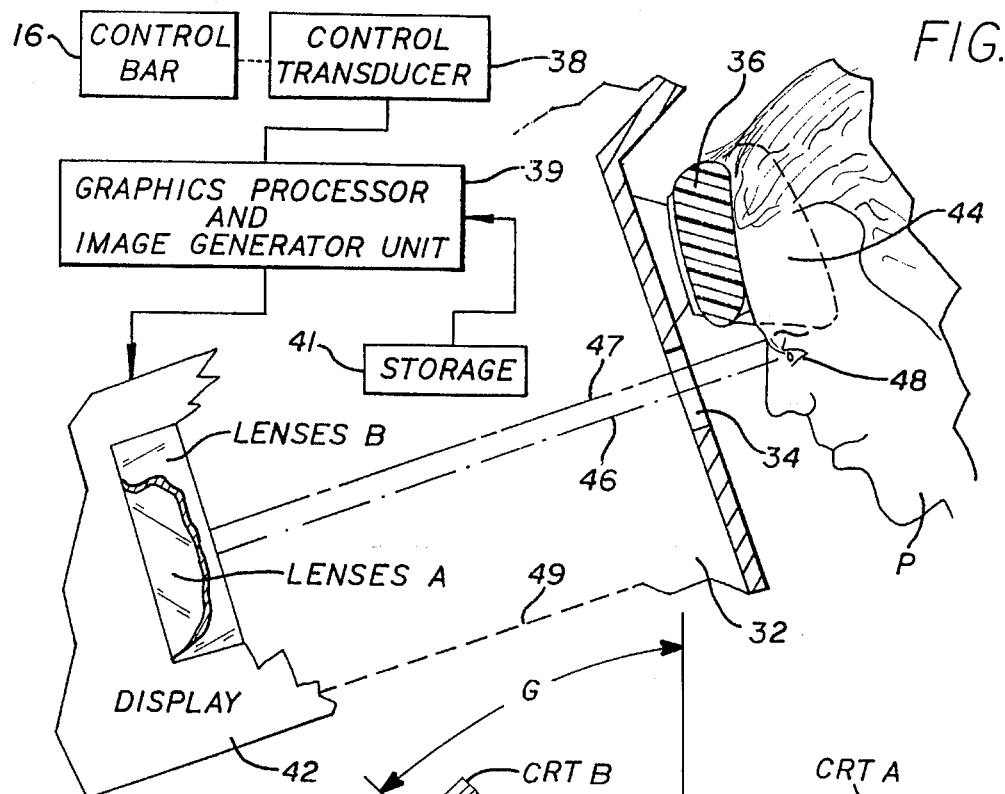
FIG. 3 is a side, partially cross sectional view illustrating the person's line of vision from both the rider's right and left eyes through a viewing aperture from a fixed point of reference provided by a head rest.

Accordingly, referring to FIG. 3, as the rider P simulating a hang glider pilot manipulates the control bar 16, responsive stereoscopic and collimated virtual image displays are provided by the video monitor 42 (left, FIG. 3) showing the rider's view as the hang glider simulates responsive movement in a programmed environment. As in contemporary simulators, computer graphics techniques provide stereo dynamic displays. Generally, an environment is programmed and positional signals are developed to indicate the position and orientation of the hang glider in the environment. Representative simulator data is then supplied to the computer graphics system of the interactive computer system 32 to attain a dynamic display.

Considering the interactive computer 32 in somewhat greater detail, for convenient illustration the control bar 16 is symbolically represented in FIG. 3 by a block (upper left). The control bar 16 is mechanically coupled to the control transducer 38 as explained above with reference to FIG. 2. As illustrated in FIG. 3, the control transducer 38 supplies control signals to a unit 39 embodying a graphics processor and an image generator as well known in the art. The unit 39 is shown connected to a storage 41 for storing related data. Forms of such structures are disclosed in a book "Fundamentals of Interactive Computer Graphics" Foley & Van Dam, published 1984 by Addison-Wesley, see Chapter 14.

In operation, the unit 39 drives the video monitor 42 to provide dynamic stereoscopic and collimated virtual image displays to the eyes of the rider P. Note that "pupil forming" displays are provided, as described below, effective for the eyes of the rider P positioned by a head rest 36.

The head rest 36 extends above the viewing aperture 34 and is formed and configured to comfortably conform to the rider's forehead. As is apparent from FIG. 3, the head rest 36 is substantially concave in shape and terminates in wide end portions 44 (shown in broken lines) designed to accommodate and locate the forehead of the rider P, limiting movement thereof. This feature provides the rider P with direct lines of vision, extending from the rider's eyes 48, through the viewing aperture 34, to images of the video display 42. Specifically, the axis 46 represents a direct line of vision from the rider's left eye to one image, and the axis 47 represents a direct line of vision from the rider's right eye to another image. It should be recognized that the axes 46 and 47 are simply for illustration purposes and do not accurately reflect positional relationships or the distance between the rider's eyes. Thus, the head rest 36 permits a rider to have a substantially fixed point of reference to view the "pupil-forming" simulated images provided by the display 42.

The fixed relationship results from the fact that the head rest 36 is rigid with respect to the display 42. Generally, that relationship is clearly indicated in FIG. 2; however, in FIG. 3, a dashed line 49 extending from the structure of the head rest 36 to the display 42 indicates a solid fixed relationship.

The display 42 embodies stereoscopic displays, which incorporate lenses, a spherical mirror, and a beamsplitter to provide a pair of pupil images. As represented in FIG. 3, adjacent sets of lenses A and B provide distinct images to the right and left eyes of the rider P. In FIG. 3, lenses B are shown as partially cut away to provide a view of lenses A.

Figure 4:
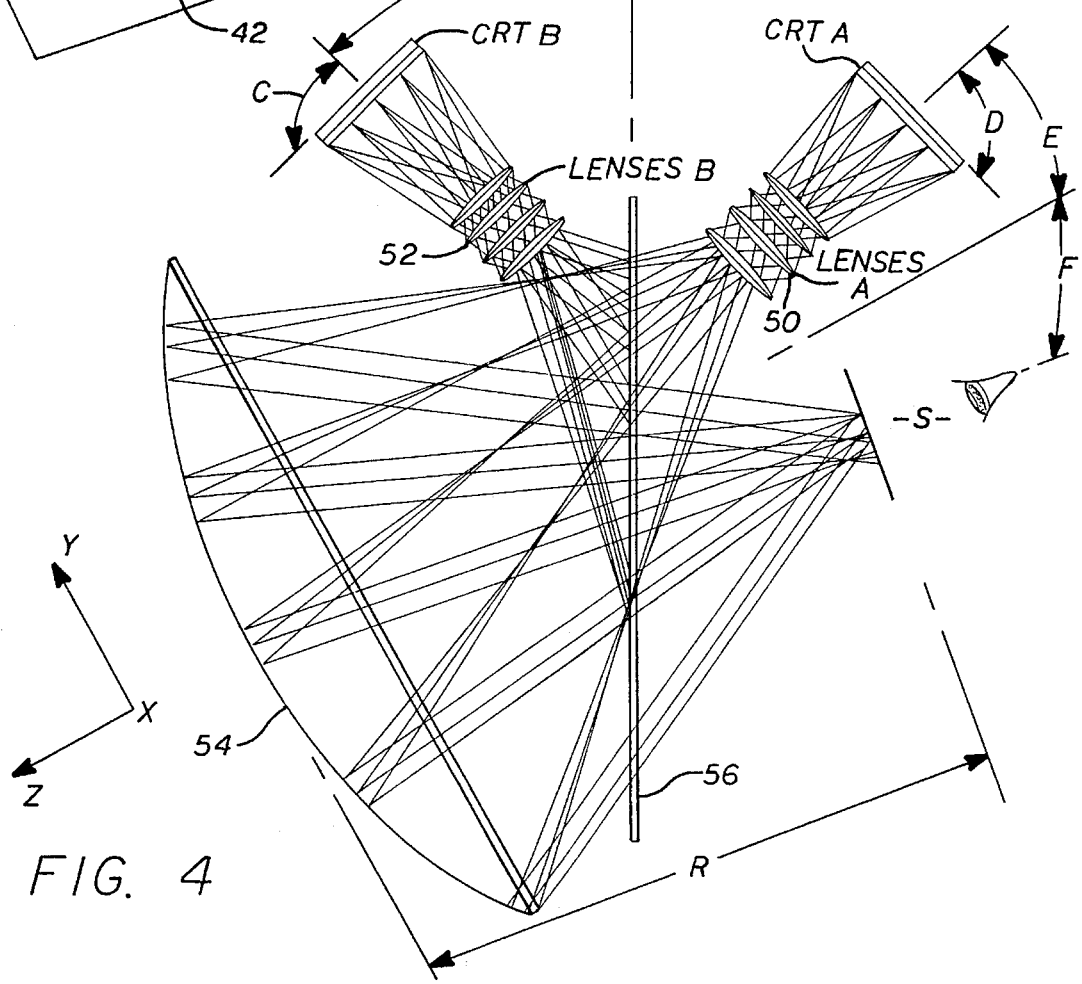
FIG. 4 is a side, plan schematic representation of the optics within the visual display, which provides a stereoscopic and collimated virtual image display of "pupil forming" images to the rider.

Within the interactive computer simulation system, the lenses A and B (described in detail below) are located to respectively receive images from two CRT's, namely CRT A and CRT B (represented as blocks, FIG. 4). CRTs A and B provide right and left eye images, respectively, of the simulated movement in a programmed environment controlled by the rider P.

The corresponding sets of lenses A and B (FIG. 4), also indicated accumulatively at 50 and 52, respectively, focus the right and left eye images from the CRTs A and B for reflection by a spherical mirror 54. The spherical mirror 54 reflects the right and left eye images to form special images for the right and left eyes, respectively, of the rider P.

Specifically, the images transmitted by lenses A and lenses B are formed in space generally designated as space S by the spherical mirror 54. A beamsplitter 56 accommodates the left and right eye images and transmits them to the spherical mirror 54 for subsequent reflection to the space S for the rider's P eyes.

The resulting display is referred to as a "pupil-forming display," because the pupils for the right and left eyes are reimaged in space by the spherical mirror 54. The images formed in the space S are seen only when the rider's eyes are critically positioned by the head rest 36. The reimaged pupils of the lenses formed in space are the "formed" pupils of the pupil-forming display. Wide angle lenses with pupils large enough to encompass both eyes and allow reasonable head motion traditionally are too expensive to be practical. For this reason, a design with two sets of smaller and more practical lenses, one or more for each eye, afford substantial advantage including image operation whereby each eye views its own image.

As a further consideration, lenses having large apertures and wide field angles are usually much larger in diameter than the actual lens pupil size. In the disclosed embodiment, the diameter between lenses A and lenses B is about 7 inches, and the actual pupil is only 2.5 inches in diameter. For this reason, lenses A and lenses B cannot be spaced so that their optical axis is at the average inter-pupillary separation of human eyes. Accordingly, the beamsplitter 56 is used to juxtapose the pupils of the two lenses with a spacing of the average human inter-ocular distance. The lenses A and B are also illustrated separately in FIGS. 5 and 6 respectively, shown in relationship to the spherical mirror 54.

The specific dimensions described below are exemplary of the disclosed embodiment. For example, the plane of CRT B is positioned at an angle of 81.58° from the optical axis of lenses B, indicated at C in FIG. 4. Similarly, the plane of CRT A is positioned at an angle of 81.58° from the optical axis of lenses B, indicated at D in FIG. 4. The focus of the spherical mirror 54 is located at a radius of 914.4 mm, indicated at R in FIG. 4. The optical axis of lenses A is offset by an angle of 9.55° from the center axis of the spherical mirror 54, indicated at E in FIG. 4. Thus, the angle between the eye of the rider and the center axis of the spherical mirror is also 9.55°, indicated at F in FIG. 4.

The image transmitted by lenses A is transmitted through the beamsplitter 56, and is reflected by the spherical mirror 54 back to be imaged for the right eye of the rider. The image transmitted by lenses B, on the other hand, is reflected by the beamsplitter 56 onto the spherical mirror 54, where it is reflected back to be imaged for the left eye of the rider. The beamsplitter 56 is positioned at a 50° angle from the optical axis of lens B, indicated at G in FIG. 4. The beamsplitter 56 is preferably 24 inches by 30 inches.

Lenses A and lenses B are located above and below, respectively, the plane of FIG. 4. At a point measured 51.6 mm from the vertex of the lens surface pointing toward the spherical mirror 54, lens A is located 31.75 mm above the plane of FIG. 4, and directed toward the plane of FIG. 4 at an angle of 4°. Similarly, at a point measured 51.6 mm from the vertex of the lens surface pointing toward the spherical mirror, lens B is located 31.75 mm below the plane of FIG. 4, and directed toward the plane of FIG. 4 at an angle of 4°. As seen in the plane of FIG. 4, the point measured 51.6 mm from the vertex of the surface of lens B pointing toward the spherical mirror is located 218 mm from the point where the optical axis of lens B intersects the beamsplitter 56.

Figure 5:
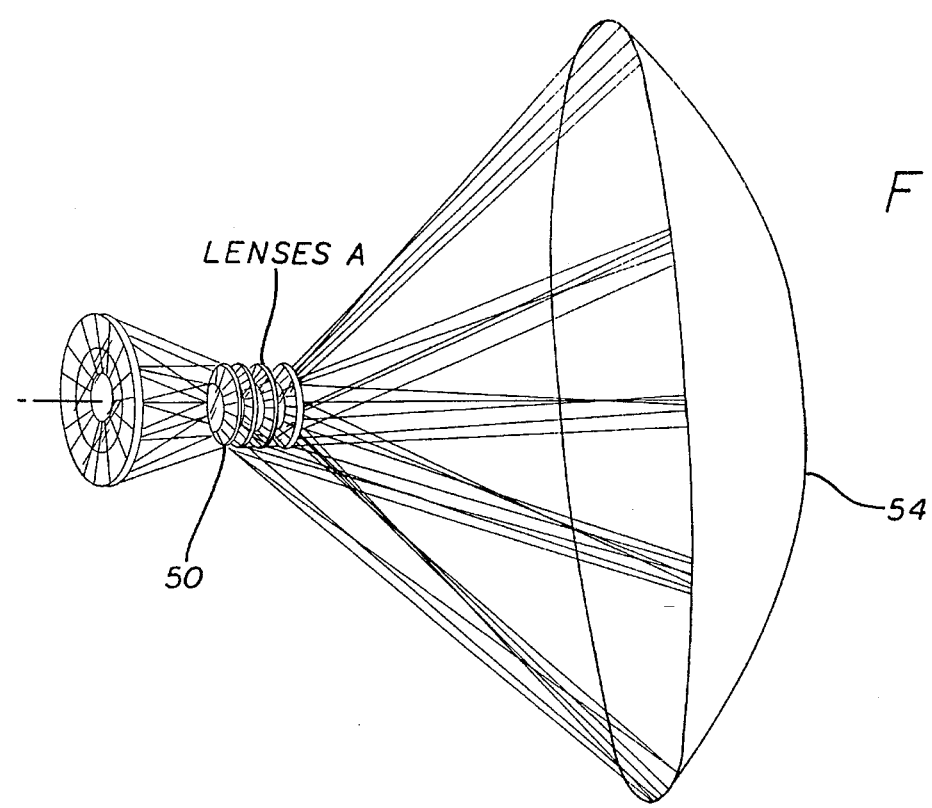
FIG. 5 is a top schematic representation of a set of lenses A of the visual display, which is offset to the left and provides an image to the rider's right eye.

Referring now to FIG. 5, lenses A, the CRT A and the spherical mirror 54 are shown in a top direct view which is offset to the left, to show the provision of the image to the right eye (shown as eye 48 in FIG. 3). The CRT B and lenses B are removed from this view to facilitate depiction of the equipment used to form only the image for the right eye (not shown, however, located at the end of axis 47 and aligned with the left eye 48 in FIG. 3). The right eye image is only viewed by the rider's right eye.

Figure 6:
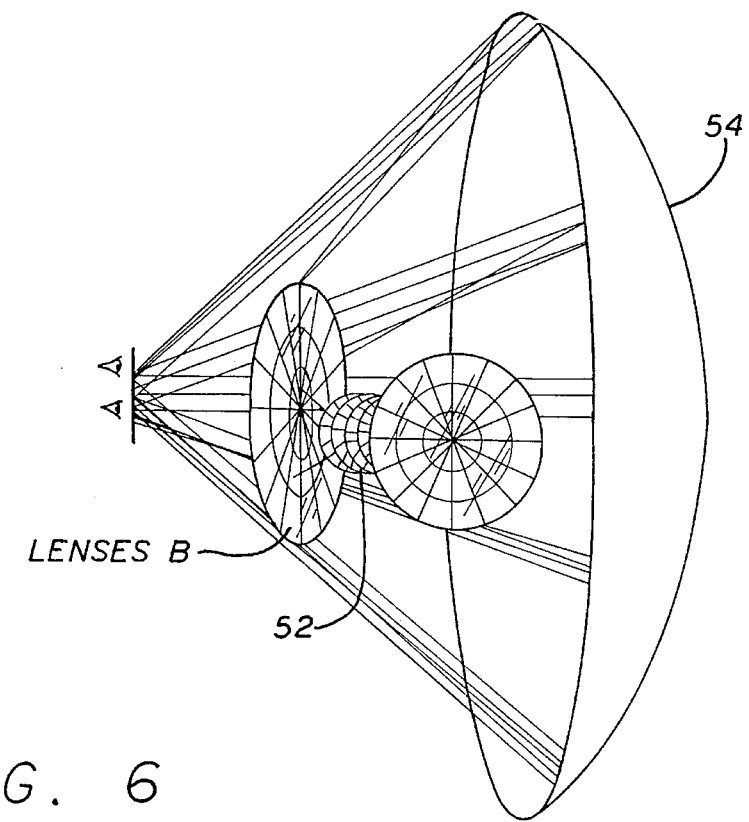
FIG. 6 is a top schematic representation of a set of lenses B of the visual display, which provides a reflected view offset to the right and provides an image to the rider's left eye.

Referring now to FIG. 6, the lenses B, the CRT B and the spherical mirror 54 are shown in a top reflected view which is offset to the right, to show the provision of the image to the left eye. The CRT A and the lenses A are removed from this view to facilitate depiction of the equipment used to form only the image for the rider's left eye. A rider's left eye is shown at 48 in FIG. 3. The left eye image is only viewed by the rider's left eye.

It should be recognized that the stereoscopic and collimated virtual image display as disclosed above, facilitates a very wide field of view and accommodates the rider's eyes to focus at infinity. Thus, the programmed environment or imagery perceived by the rider P appears to be in the distance. Moreover, not only is the binocular convergence of the rider's eyes parallel, but the focus of the eyes is relaxed as if collimated.

What is claimed is:

1. A system for use by a person to simulate real time experiences in a hang glider or the like:

a mechanical support structure for suspending a person in mid-air;

control means associated with said mechanical structure and actuable to provide control signals representative of shifting movements of said mechanical support structure initiated by the person; and display means coupled to said control means to receive electrical signals indicative of said shifting movements in a programmed environment and to provide stereoscopic pupil forming images of positional states of said hang glider to the person at a critical point of reference fixed relative to said display means, said display means comprising a positioning means and a viewing area, said positioning means for locating the person's head relative to said viewing area, thereby enabling said stereoscopic pupil forming images to be focused directly into the person's eyes.

2. A system according to claim 1, wherein said control means further comprises:

a movable control bar maneuverable by the person in at least one of forward, backwards or side movements to simulate movements of a hang glider.

3. A system according to claim 1, further comprising; a harness for suspending the person in mid-air to allow the person with freedom of movement to maneuver said control means.

4. A system according to claim 1, wherein said positioning means is disposed above said viewing area for providing the person with said point of reference fixed relative to said viewing area.

5. A system according to claim 4, wherein said positioning means is a head rest configured to accommodate the person's forehead and limit undue movement thereof.

6. A system according to claim 1, wherein said display means is coupled to an interactive computer, said interactive computer providing said programmed environment with flight simulation software.

7. A system according to claim 1, further comprising:

an interactive computer coupled to said display means and said control means, said interactive computer providing said programmed environment and further comprising:

at least two CRTs for providing left and right eye images of simulated movement in said programmed environment;

at least two lenses arranged relative to said CRTs to focus the left and right eye images;

a spherical mirror for reflecting said left and right eye images to left and right eyes, respectively, of the person; and a beamsplitter arranged relative to said lenses to superimpose said left and right eye images and transmit said images to said spherical mirror for subsequent reflection to said left and right eyes of the person.

8. A method for simulating real time hang gliding or like experiences in a computer interactive system, comprising the steps of:

suspending a person in a harness supported by a mechanical support structure;

providing control means associated with said mechanical structure and actuable by the person to provide control signals representative of shifting movements of said control means initiated by the person;

transmitting electrical signals representative of said shifting movements to a display monitor;

displaying stereoscopic pupil forming images indicative of positional states of said hang glider responsive to said electrical signals to the person at a critical reference point fixed relative to said display monitor; and locating the person's head at said critical reference point fixed relative to said display means with a positioning means, thereby focusing the stereoscopic pupil forming images directly into the person's eyes through a viewing area of said display means.

* * * * *